United States Patent

Sung

[11] Patent Number: 5,961,699
[45] Date of Patent: Oct. 5, 1999

[54] CANISTER APPARATUS

[75] Inventor: Yeoun-Kwan Sung, Suwon, Rep. of Korea

[73] Assignee: Hyundai Motor Company, Rep. of Korea

[21] Appl. No.: 09/021,590

[22] Filed: Feb. 10, 1998

[51] Int. Cl.⁶ .................................................. B01D 53/04
[52] U.S. Cl. ................................ 96/135; 96/136; 96/144
[58] Field of Search ............................ 96/108, 134, 136, 96/143, 144, 157, 158, 168, 247

[56] References Cited

U.S. PATENT DOCUMENTS

| | | | |
|---|---|---|---|
| 1,591,079 | 7/1926 | Burnham et al. | 96/158 |
| 3,048,958 | 8/1962 | Barnes | 96/136 |
| 3,728,846 | 4/1973 | Nilsson | 96/134 |
| 3,985,626 | 10/1976 | Klein | 96/157 X |
| 4,058,380 | 11/1977 | King, II | 96/144 |
| 4,403,587 | 9/1983 | Mizuno et al. | 96/144 |
| 4,655,189 | 4/1987 | Koga | 96/136 |
| 4,658,796 | 4/1987 | Yoshida et al. | 96/144 X |
| 4,683,862 | 8/1987 | Fornuto et al. | 96/134 X |
| 4,703,736 | 11/1987 | Atkins, Sr. | 96/144 |
| 4,714,485 | 12/1987 | Covert et al. | 96/143 |
| 4,750,465 | 6/1988 | Pediker, Jr. et al. | 96/144 X |
| 4,853,009 | 8/1989 | Turner et al. | 96/144 X |
| 5,119,791 | 6/1992 | Gifford et al. | 96/144 X |
| 5,149,347 | 9/1992 | Turner et al. | 96/136 X |
| 5,173,095 | 12/1992 | Yasukawa et al. | 96/144 X |
| 5,304,235 | 4/1994 | Watanabe et al. | 96/144 |
| 5,653,788 | 8/1997 | Haruta | 96/144 |

FOREIGN PATENT DOCUMENTS 1-227861  9/1989  Japan ........................................ 96/136

*Primary Examiner*—Robert Spitzer
*Attorney, Agent, or Firm*—Christie, Parker & Hale, LLP

[57] ABSTRACT

A canister apparatus having a main body with activated carbon for absorbing fuel vapor; an air tank having a suction port and a filter for filtering harmful materials drawn through the suction port; a first guide pipe for guiding air sucked into the air tank to the main body in order to mix the air with the fuel vapor absorbed in the activated carbon for generating an air-fuel mixture; a float for closing a connecting port between the air tank and the main body to prevent water sucked from the suction port into the air tank from flowing into the body; and a guide for guiding the float upward in the air tank, so diffusion of harmful gas to the atmosphere can be prevented by preventing water from flowing into the main body thereby increasing fuel vapor absorbing efficiency of the activated carbon for air pollution prevention.

3 Claims, 3 Drawing Sheets

CANISTER APPARATUS

BACKGROUND OF THE INVENTION

1. Field of the Invention

This invention relates to a canister apparatus for an internal combustion engine used for preventing harmful gas from diffusing to atmosphere by absorbing fuel vapor occurring upon fuel evaporation, and more particularly to a canister apparatus for preventing water from flowing into activated carbon so that the absorbing efficiency of the activated carbon can be further improved.

2. Description of the Prior Art

As shown in FIG. 1, a canister apparatus for preventing harmful gas from diffusing to atmosphere by absorbing fuel vapor occurring upon fuel evaporation includes a main body 1 having a lot of activated carbons 2 therein, a first guide pipe 3 for guiding fuel vapor to the main body 1, a second guide pipe 4 connected to the main body 1 for discharging fuel-air mixture from the main body 1 to engine, and a third guide pipe 7 connected to the main body 1 for introducing air into the main body 1.

An air tank 5 having a filter 6 therein for filtering harmful materials such as dust included in the air is installed at a lateral side of the body 1 and a suction port 8 is formed at a bottom surface of the air tank 5.

In such a conventional canister apparatus, fuel vapor vaporized at a fuel tank is guided by the first guide member 3 to flow into the main body 1, and the fuel vapor infused into the main body 1 becomes absorbed by activated carbons 2 filled in the body 1.

Therefore, diffusion of harmful gas to the atmosphere is restrained to prevent air pollution because the fuel vapor is absorbed by the activated carbons 2.

Meanwhile, when an engine is operated, air in the atmosphere is sucked through the suction port 8 formed at the air tank 5. The sucked air is provided into the main body 1 by being guided by a third guiding member 7 after harmful materials such as dust included in the sucked air are filtered by the filter 6 installed at the air tank 5.

Then, the air provided to the main body 1 is mixed with fuel vapor absorbed in the activated carbon 2 by negative pressure generated in an intake manifold to thereby be inverted into an air-fuel mixture. The air-fuel mixture is provided to the engine to be burned and guided by a third guide member 7.

However, there is a problem in the conventional canister apparatus, in that when it rains or a vehicle passes over a puddle, water may flow into the air tank 5 since the air tank 5 is installed at a side of the canister exposed outside of the bottom of the vehicle. Such water soaked into the air tank 5 flows into the main body 1 through the third guide member 7.

In other words, there is a problem in the conventional canister apparatus in that if water flows into the main body 1, fuel vapor absorbing efficiency of the activated carbons decreases, so that some harmful fuel vapor not having been absorbed by the activated carbons, is diffused to the atmosphere and contaminates the atmosphere.

Accordingly, it is an object of the present invention to provide a canister apparatus for restraining diffusion of harmful gas to the atmosphere in order to thereby prevent air pollution by avoiding water from flowing into the main body for preservation of the fuel vapor absorbing efficiency of the activated carbons.

SUMMARY OF THE INVENTION

The above and other objects are achieved according to the invention of a canister apparatus, the apparatus comprising:

a main body having a lot of activated carbon filled therein for absorbing fuel vapor;

an air tank having a suction port for sucking air therethrough and a filter installed therein for filtering harmful materials such as dust included in the air sucked through the suction port;

a first guide pipe for guiding the air sucked into the air tank to the main body in order to mix the air with the fuel vapor absorbed in the activated carbons for generating an air-fuel mixture;

float means for closing a connecting port between the air tank and the main body and for being floated by a floating force of water in order to prevent water sucked from the suction port into the air tank from flowing into the body; and guide means for guiding the float means to be floated upward in the air tank.

There is an advantage according to the present invention constructed as described above, where the fuel vapor absorbing efficiency of activated carbons is increased to prevent diffusion of harmful gas to the atmosphere because when water flows into the air tank, water infused into the air tank cannot flow to the main body having activated carbons.

DESCRIPTION OF THE DRAWINGS

For fuller understanding of the nature and objects of the invention, reference should be made to the following detailed description taken in conjunction with the accompanying drawings in which.

DESCRIPTION OF THE PREFERRED EMBODIMENTS

The preferred embodiments of the present invention will now be described in detail with reference to the accompanying drawings.

Figure 1:
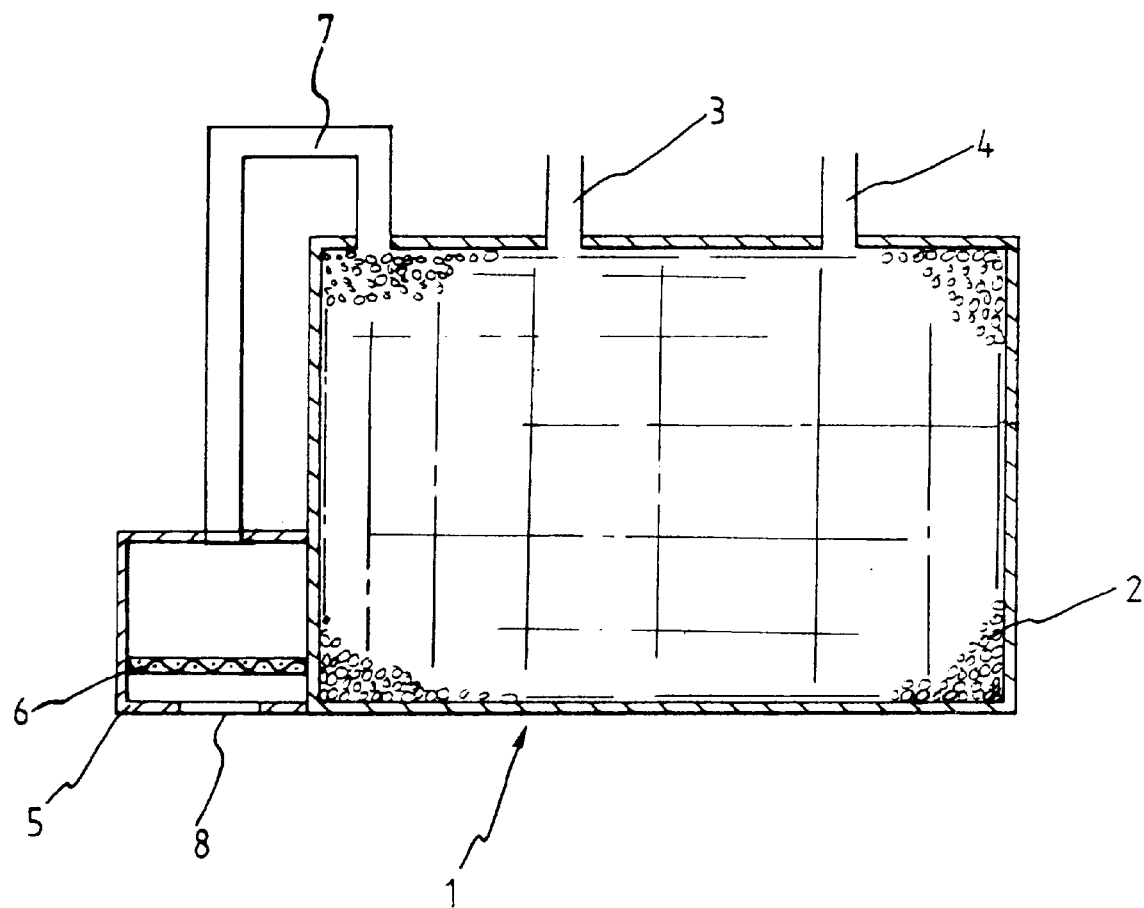
FIG. 1 is a cross-sectional view for showing an inner structure of a conventional canister apparatus.
Figure 2:
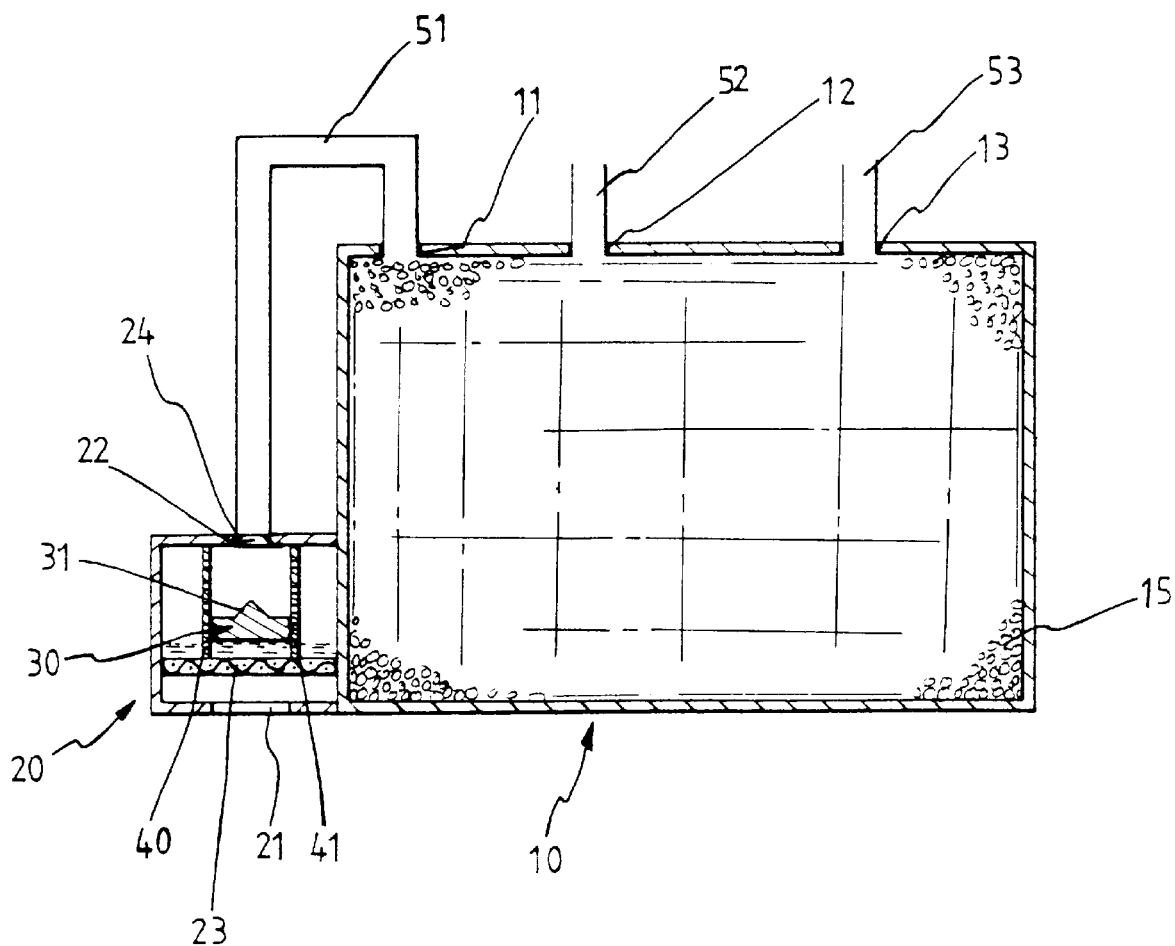
FIG. 2 is a cross-sectional view for showing an inner structure of a canister apparatus constructed according to the present invention.
Figure 3:
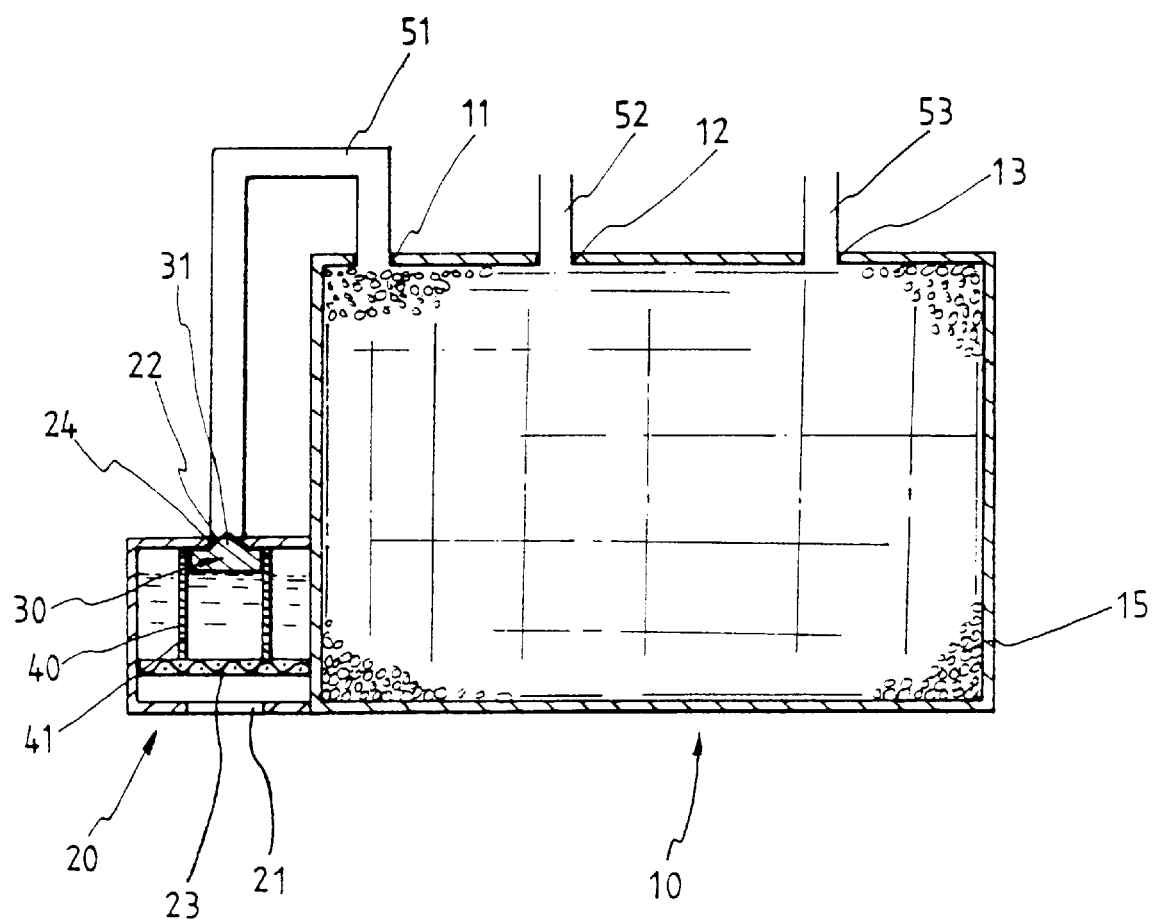
FIG. 3 is a cross-sectional view similar to FIG. 2 for showing a condition where water flows into an air tank.

FIG. 2 shows an inner structure of a canister apparatus constructed according to the present invention, and FIG. 3 shows a condition of the canister apparatus where water flows into an air tank.

In FIGS. 2 and 3, reference numeral 10 indicates a main body forming an outer shape of the canister apparatus and having a lot of activated carbon 15 filled therein for absorbing fuel vapor. A first connection port 11, a second connection port 12 and a third connection port 13 are respectively formed with a predetermined space therein at the main body.

A first guide pipe 51 for guiding airflow is connected to the first connection port 11 formed at the main body 10, a second guide pipe 52 for guiding fuel vapor flow is connected to the second connection port 12 in order to guide the fuel vapor occurring upon fuel evaporation to the main body 10, and a third guide pipe 53 for guiding the air-fuel mixture is connected to the third connection port 13 in order to guide the air-fuel mixture which is made of fuel vapor elements absorbed in the activated carbons mixed with air guided to the main body by the first guide pipe 51 to the combustion chamber of the engine by negative pressure generated at an intake manifold.

On the other hand, reference numeral 20 indicates an air-tank fixed at a lateral surface of the main body 10. And the air-tank 20 has a suction port 21 at the bottom for sucking air therethrough and a fourth connection port 24 at the top thereof for being connected to the first guide pipe 51.

Further, a filter 23 for filtering harmful materials such as dust included in the air sucked through the suction port 21 is installed in the air-tank 20.

In addition, float means 30 is installed in the air-tank 20, so the float means 30 floats upward by floating force of water to prevent water from flowing into the main body 10 through the first guide pipe 51 when water enters the air-tank 20 through the suction port 21.

The float means 30 has a protrusion 31 on the top surface and the air-tank 20 has a hole 22 at the top inner surface for receiving the protrusion 31 therein for sealing.

That is, the float means 30 is made of materials such as foamed materials having lower density than water. So the float means 30 is raised upward by a floating force of water and then the protrusion 31 of the float means 30 inserts into the hole 22 to seal the hole 22 so that water is prevented from flowing into the main body 10 through the first guide pipe 51 when water enters through the suction port 21.

Further, guide means 40 is extended from the inner top surface of the air tank 20 to the filter 23 in the air tank 20 in order to help the float means 30 received therein to rise upward without shaking when water enters into the air tank 20 through the suction port 21.

In addition, the guide means 40 has a plurality of vent holes 41 at the circumferential surface through which air and water sucked through the suction port 21 flows into and out of the guide means 40 smoothly.

Now, the operation and effects of the canister apparatus according to the present invention will be described.

First of all, fuel vapor vaporized in a fuel tank is provided to the main body 10 guided by the second guide pipe 52, and the fuel vapor provided into the body 10 is absorbed by the activated carbons 15 filled in the main body 10.

Therefore, harmful gas does not diffuse to the atmosphere to prevent air pollution since the fuel vapor is absorbed by the activated carbons 15 in the main body 10.

Meanwhile, when the engine is operated, air in the atmosphere is sucked through the suction port 21 and formed at the air tank 20. Then, harmful materials such as dust included in the air are filtered by the filter 23 installed in the air tank 20 and the filtered air is provided into the main body 10 being guided by a first guiding pipe 51.

In addition, the air provided to the body 10 is mixed with fuel vapor absorbed by the activated carbon 15 by negative pressure generated in an intake manifold to be inverted into an air-fuel mixture. The air-fuel mixture is provided into the engine being guided by a third guide member 53 to be burned.

Meanwhile, when it rains or a vehicle passes over a puddle, water may enter into the air tank 20 through the suction port 21 since the air-tank 20 is installed being exposed on the outside.

When water flows into the air tank 5, the float means 30 rises upward as shown in FIG. 3, and then the protrusion 31 formed on the float means 30 inserts into the hole 22.

If the protrusion 31 of the float means 30 inserts into the hole 22, the fourth connection port 24 becomes closed to prevent water flowing into the air tank from coming into the main body 10.

Unless water comes into the main body 10, fuel vapor absorbing efficiency of the activated carbons filled in the main body 10 does not decrease, so that the activated carbons can absorb much more fuel vapor to effectively prevent diffusion of harmful gas to the atmosphere.

There is an advantage in the canister apparatus according to the present invention as described above, in that diffusion of harmful gas to the atmosphere can be prevented by preventing water from flowing into the main body and therefore increasing fuel vapor absorbing efficiency of activated carbons for air pollution prevention.

What is claimed is:

1. A canister apparatus comprising:

a main body having activated carbon therein for absorbing fuel vapor;

an air tank having a suction port for sucking air therethrough and a filter installed therein for filtering harmful materials included in the air sucked through the suction port;

a first guide pipe for guiding the air sucked into the air tank to the main body in order to mix the air with the fuel vapor absorbed in the activated carbon for generating an air-fuel mixture;

float means for closing a connecting port between the air tank and the main body and for being floated by a floating force of water in order to prevent water sucked from the suction port into the air tank from flowing into the body; and guide means for guiding the float means to be floated upward in the air tank.

2. The canister apparatus as claimed in claim 1 wherein said float means has a protrusion at the top surface and said air tank has a hole at the inner top surface to receive the protrusion for sealing.

3. The canister apparatus as claim in claim 1 wherein said guide means has a plurality of vent holes at the circumferential surface through which air and water sucked through the suction port flows into and out of the guide means smoothly.

* * * * *